United States Patent
Kovác et al.

(10) Patent No.: US 11,436,331 B2
(45) Date of Patent: Sep. 6, 2022

(54) SIMILARITY HASH FOR ANDROID EXECUTABLES

(71) Applicant: Avast Software s.r.o., Prague (CZ)

(72) Inventors: Peter Kovác, Prague (CZ); Jan Piskácek, Sestajovice (CZ)

(73) Assignee: Avast Software s.r.o., Prague (CZ)

(*) Notice: Subject to any disclaimer, the term of this patent is extended or adjusted under 35 U.S.C. 154(b) by 73 days.

(21) Appl. No.: 16/745,230

(22) Filed: Jan. 16, 2020

(65) Prior Publication Data

US 2021/0224390 A1  Jul. 22, 2021

(51) Int. Cl.
*G06F 21/00* (2013.01)
*G06F 21/56* (2013.01)
*H04L 9/40* (2022.01)

(52) U.S. Cl.
CPC .......... *G06F 21/567* (2013.01); *G06F 21/562* (2013.01); *G06F 2221/033* (2013.01); *H04L 63/02* (2013.01)

(58) Field of Classification Search
CPC ................. G06F 21/567; G06F 21/562; G06F 2221/033; H04L 63/02
See application file for complete search history.

(56) References Cited

U.S. PATENT DOCUMENTS

| | | | |
|---|---|---|---|
| 8,806,641 B1 | 8/2014 | Li et al. | |
| 9,158,915 B1* | 10/2015 | Yumer | G06F 21/552 |
| 9,525,706 B2 | 12/2016 | Seungwon et al. | |
| 9,916,448 B1 | 3/2018 | Zhang et al. | |
| 10,303,874 B2 | 5/2019 | Wang et al. | |
| 10,484,419 B1* | 11/2019 | Davis | G06F 21/577 |
| 2012/0051657 A1* | 3/2012 | Lamanna | G06F 40/194 382/218 |

(Continued)

FOREIGN PATENT DOCUMENTS

| | | |
|---|---|---|
| CN | 103473506 A | 12/2013 |
| CN | 107239678 A | 10/2017 |

(Continued)

OTHER PUBLICATIONS

Fan et al., "Visual object tracking based on perceptual hash algorithm", 2015 12th International Computer Conference on Wavelet Active Media Technology and Information Processing (ICCWAMTIP), Date of Conference: Dec. 18-20 (Year: 2015).*

(Continued)

*Primary Examiner* — Morshed Mehedi
(74) *Attorney, Agent, or Firm* — Avek IP, LLC; William B. Kircher

(57) ABSTRACT

A method of generating a similarity hash for an executable includes extracting a plurality of characteristics for one or more classes in the executable, and transforming the plurality of characteristics into a set of one or more class fingerprint strings corresponding to the one or more classes. The set of class fingerprint strings is transformed into a hash string using minwise hashing, such that a difference between hash strings for different executables is representative of the degree of difference between the executables. The hash of a target executable is compared with hashes of known malicious executables to determine whether the target executable is likely malicious.

18 Claims, 3 Drawing Sheets

(56) References Cited

U.S. PATENT DOCUMENTS

| | | | |
|---|---|---|---|
| 2012/0215853 A1* | 8/2012 | Sundaram | H04L 63/126 709/206 |
| 2016/0098284 A1* | 4/2016 | Herberg | G06F 9/4411 719/327 |
| 2016/0255107 A1* | 9/2016 | Qian | H04L 63/1433 726/23 |
| 2017/0289082 A1* | 10/2017 | Shen | H04L 51/12 |
| 2017/0337376 A1* | 11/2017 | Reader | G06F 21/567 |
| 2019/0132334 A1* | 5/2019 | Johns | G06N 3/04 |
| 2020/0019605 A1* | 1/2020 | Ren | G06F 21/556 |
| 2021/0192047 A1* | 6/2021 | Ren | G06F 21/564 |

FOREIGN PATENT DOCUMENTS

| | | |
|---|---|---|
| CN | 107273746 A | 10/2017 |
| CN | 109543408 A | 3/2019 |
| KR | 101214893 B1 | 1/2013 |
| KR | 20140030989 A | 3/2014 |
| WO | 2014012459 A1 | 1/2014 |

OTHER PUBLICATIONS

Tom Czayka et al.; Android Application Diffing: Engine Overview; Apr. 24, 2019.

* cited by examiner

SIMILARITY HASH FOR ANDROID EXECUTABLES

FIELD

The invention relates generally to identifying similarity between Android applications, and more specifically to a scalable and obfuscation-resistant similarity hash for Android executable code such as Dalvik executables.

BACKGROUND

Computers are valuable tools in large part for their ability to communicate with other computer systems and retrieve information over computer networks. Networks typically comprise an interconnected group of computers, linked by wire, fiber optic, radio, or other data transmission means, to provide the computers with the ability to transfer information from computer to computer. The Internet is perhaps the best-known computer network, and enables millions of people to access millions of other computers such as by viewing web pages, sending e-mail, or by performing other computer-to-computer communication.

But, because the size of the Internet is so large and Internet users are so diverse in their interests, it is not uncommon for malicious users to attempt to communicate with other users' computers in a manner that poses a danger to the other users. For example, a hacker may attempt to log in to a corporate computer to steal, delete, or change information. Computer viruses or Trojan horse programs may be distributed to other computers or unknowingly downloaded such as through email, download links, or smartphone apps. Further, computer users within an organization such as a corporation may on occasion attempt to perform unauthorized network communications, such as running file sharing programs or transmitting corporate secrets from within the corporation's network to the Internet.

To prevent malicious software from being installed or executed on smart phones, some smart phones such as Apple restrict the ability of a user to install software such that only software approved by the vendor. Other smart phone ecosystems such as Google's Android allow a greater range of applications, including less stringent examination of applications distributed through the official Google Play app store as well as the ability to "side load" applications from sources other than the official app store. This greater freedom increases the flexibility of Android devices for some users to run obscure or customized applications, but also provides opportunity for malicious developers to include malware in Android distributed Dalvik executables that can be executed on Android devices but can't be easily detected by traditional antivirus techniques.

Antivirus software, firewalls, and other security systems may be configured to identify known malicious Android applications, such as by using signatures, characteristics or heuristics, or artificial intelligence techniques. But, those producing malicious code often change the code to have different signatures and characteristics to avoid detection. For example, a developer may rename identifiers or variables, encrypt a string within the executable, or change flow control using obfuscation techniques to make an executable look different than the known and detectable executable code on which it is based, making the obfuscated code unrecognizable to a traditional antivirus or antimalware systems with a record of the known and detectable malicious code.

It is therefore desirable to provide improved methods of recognizing similarity between Android executables such as Dalvik executables.

SUMMARY

In one example embodiment, a similarity hash for an executable is generated by extracting a plurality of characteristics for one or more classes in the executable and transforming the plurality of characteristics into a set of one or more class fingerprint strings corresponding to the one or more classes. The set of class fingerprint strings is transformed into a hash string using minwise hashing, such that a difference between hash strings for different executables is representative of the degree of difference between the executables.

In a further example, the hash of a target executable is compared with hashes of known malicious executables to determine whether the target executable is likely malicious.

The details of one or more examples of the invention are set forth in the accompanying drawings and the description below. Other features and advantages will be apparent from the description and drawings, and from the claims.

DETAILED DESCRIPTION

Figure 1:
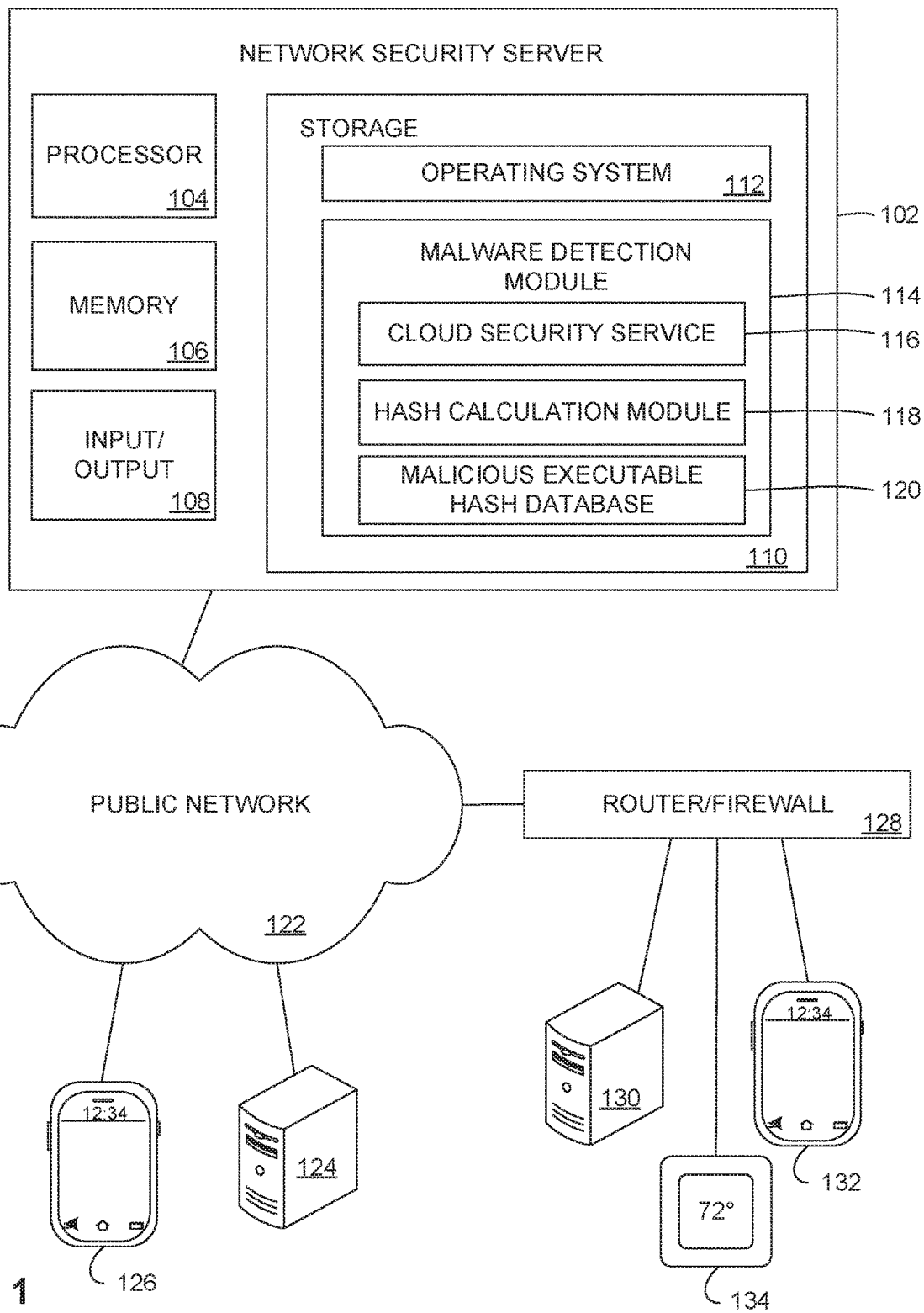
FIG. 1 shows a network with a server operable to detect known malicious code in Android applications using an application hash, consistent with an example embodiment.

In the following detailed description of example embodiments, reference is made to specific example embodiments by way of drawings and illustrations. These examples are described in sufficient detail to enable those skilled in the art to practice what is described, and serve to illustrate how elements of these examples may be applied to various purposes or embodiments. Other embodiments exist, and logical, mechanical, electrical, and other changes may be made.

Features or limitations of various embodiments described herein, however important to the example embodiments in which they are incorporated, do not limit other embodiments, and any reference to the elements, operation, and application of the examples serve only to define these example embodiments. Features or elements shown in various examples described herein can be combined in ways other than shown in the examples, and any such combinations is explicitly contemplated to be within the scope of the examples presented here. The following detailed description does not, therefore, limit the scope of what is claimed.

As networked computers and computerized devices such as smart phones become more ingrained into our daily lives, the value of the information they store, the data such as passwords and financial accounts they capture, and even their computing power becomes a tempting target for criminals. Hackers regularly attempt to log in to computers to steal, delete, or change information, or to encrypt the information and hold it for ransom via "ransomware." Smartphone apps, Microsoft® Word documents containing macros, Java™ applets, and other such common documents are all frequently infected with malware of various types, and so users rely on tools such as antivirus software or other malware protection tools to protect their computerized devices from harm.

An increasing number of smart phones, set top boxes, and IoT or Internet of Things devices run on the Android operating system pioneered by Google, which allows anyone to write and distribute applications. Although some Android applications are distributed by Google's app store, called Google Play, third party Android app stores and distribution methods are common. This environment makes distribution of malicious applications relatively easy, often in the form of legitimate applications with malicious code hidden in the application. But, the malicious code is rarely newly composed for each malicious application distributed, and so bears at least some similarity to previous malicious applications that use the same code. Anti-malware software can therefore attempt to detect new malicious applications by looking at similarities between new applications and known malicious applications or known malicious application families.

Malicious applications often attempt to elude such detection by changing the sequence of instructions, changing variable or data structure names, or by other obfuscation techniques, which can make comparison of an Android application with signatures of known malicious applications difficult. Other detection methods use very detailed analysis of applications, typically extracting detailed information from the application to accurately characterize it at the expense of complexity and computational efficiency.

Some examples presented herein therefore provide an efficient and robust method of detecting malicious applications by comparing a hash of an application with a hash data set from known malicious applications. In a more detailed example, the similarity hash is generated by extracting a plurality of characteristics for one or more classes in the executable and transforming the plurality of characteristics into a set of one or more class fingerprint strings corresponding to the one or more classes. The set of class fingerprint strings is transformed into a hash string using minwise hashing, such that a difference between hash strings for different executables is representative of the degree of difference between the executables.

In a further example, the hash of a target executable is compared with hashes of known malicious executables to determine whether the target executable is likely malicious. Such a method can be used in malware detection software to detect, delete, or block software containing malicious code, or can be used to construct a "trusted" app store for Android that contains only applications that have been screened using such methods and are unlikely to contain malware.

FIG. 1 shows a network with a server operable to detect known malicious code in Android applications using an application hash, consistent with an example embodiment. Here, a network security 102 includes a processor 104, a memory 106, and input/output 108 such as a network connection or other interfaces. Storage 110 contains instructions executable on the processor 104 when loaded into memory 106, such as operating system 112 and malware detection module 114, as well as other data. The malware detection module includes a cloud security service 116 that is operable to receive Android executables and compare their hashes to hashes of known malicious Android executables, such as by using hash calculation module 118 and malicious executable hash database 120.

A public network 122 such as the Internet links the network security server 102 to other computerized devices, such as public network devices including public network computer 124 and public network smart phone 126, as well as private network devices protected by a router or firewall 128, such as private network computer 130, private network smartphone 132, and private network Internet of Things (IoT) device 134.

In operation, an end user device running the Android operating system wishes to install an Android application, and to verify that the Android application is unlikely to contain malware. This is achieved via software running on the device, through software running on a security appliance or router/firewall 128, through a web portal to a service such as network security server 102, or through other such means. In one such example, public network smartphone 126 wishes to install a new Android application, and requests the application be checked by network security server 102 via public network 122. The request may be an app from a third-party app store such as Google Play that is scanned by network security server 102 before being installed on smartphone 126, or may be a request to an app store of pre-scanned apps hosted or referenced by network security server 102. The network security server 102 receives the Android app in its malware detection module 114 via could security service 116, and calculates a hash of the Android app via hash calculation module 118. The calculated hash is then compared to hashes from the malicious executable hash database 120, to determine whether the Android app's hash matches or is very similar to a hash in the database. If an identical or very similar hash exists, the Android app is identified as being potentially malicious, and if no identical or very similar hash is found, the Android app is not determined likely to contain malicious code.

In another example, a computerized device with more processing power such as computer 124 wishes to install an Android app, and is operable to implement at least some of the functions of malware detection module 114 locally rather than relying on a remote cloud service to perform the hash calculation and comparison. In one such example, public network computer 124 calculates the hash of the Android executable it wishes to install locally, and then sends the calculated hash to network security server 102 for comparison against malicious executable hash database 120 and determination of whether the Android app is likely malicious.

A network security device such as a router or firewall 128 is employed in some examples to perform at least some of the functions of detecting malicious Android applications using hashes. In one such example, an IoT (Internet of Things) device such as smart thermostat 134 that runs Android wises to install an Android application, which is downloaded over public network 122. Before the smart thermostat 134 receives the Android application from public network 122, it is scanned by router/firewall 128 such as by computing a hash of the Android application and comparing the hash to hashes of known malicious Android applications to determine whether the Android application is likely malicious. In another such example, the router/firewall 128 relies on network security server 102 to perform some or all of the functions related to calculating a hash of the Android application and comparing the hash to hashes of known malicious applications to determine whether the application being installed is likely malicious.

In each of these examples, a computerized device inspects an Android application to generate a hash of the application, which can then be compared to a data set of hashes of known malicious applications to determine whether the Android application is likely malicious. If the Android application is determined to be likely malicious, it can be blocked from installation, can be uninstalled, can be blocked from execution, or other such action taken to protect a device from installing and/or executing the potentially malicious Android application. In some such examples, installed applications are hashed and the hashes are periodically checked against a database of hashes of known malicious executables, such that previously installed applications can be identified as malicious if an update to the database includes the same or very similar hash in its data set.

The hash in these examples is desirably computationally simple to generate, but difficult to intentionally change such as by obfuscation techniques like changing variable and function or method names or inserting dummy code that does not execute. The hash in one example is therefore generated by extracting a plurality of characteristics for one or more classes in the executable and transforming the plurality of characteristics into a set of one or more class fingerprint strings corresponding to the one or more classes. The set of class fingerprint strings is transformed into a hash string using minwise hashing, such that a difference between hash strings for different executables is representative of the degree of difference between the executables. This enables comparison of a hash of a target Android application with hashes of known malicious executables to determine whether the target executable is likely malicious.

Figure 2:
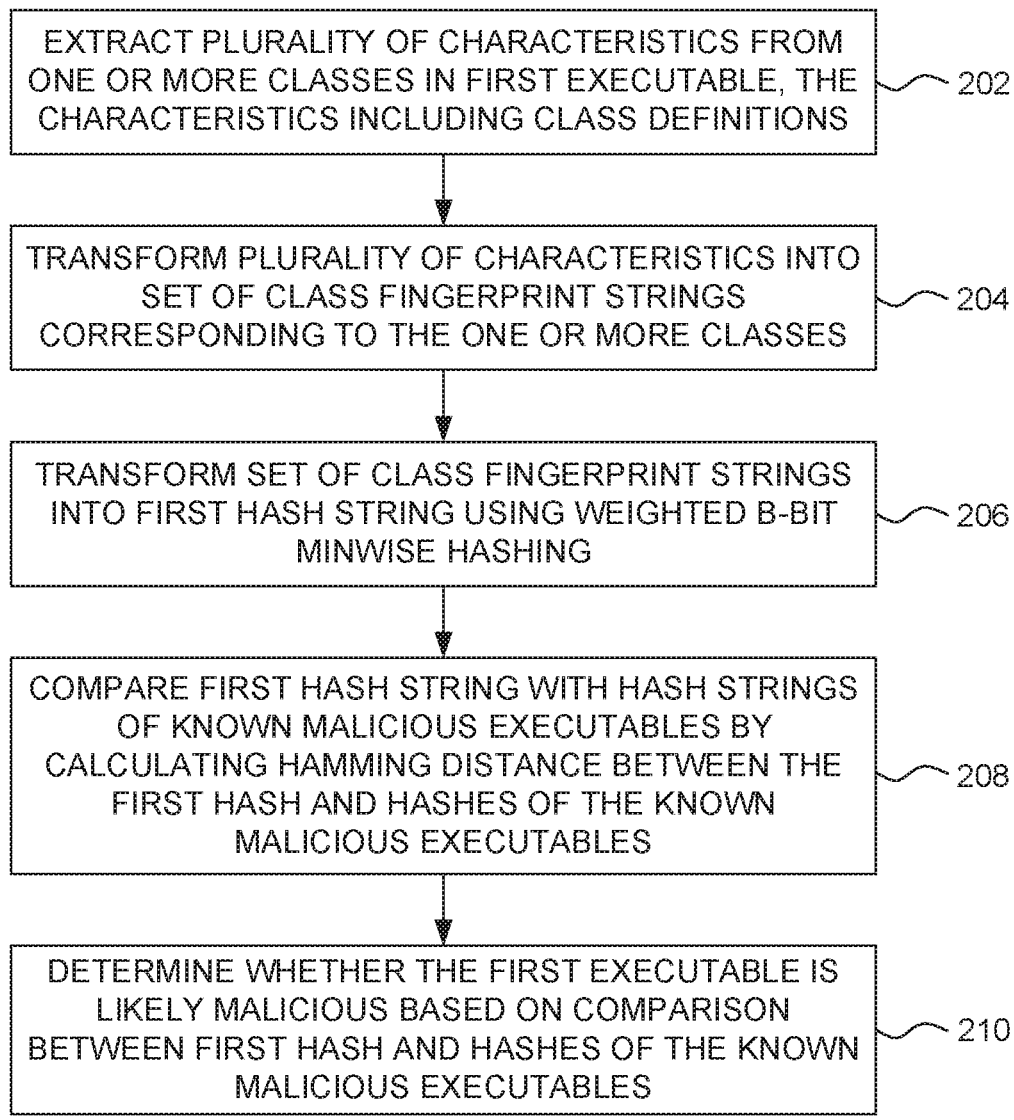
FIG. 2 is a flowchart of a method of generating a similarity hash for an Android executable, consistent with an example embodiment.

FIG. 2 is a flowchart of a method of generating a similarity hash for an Android executable, consistent with an example embodiment. A first or target executable is identified for analysis, such as a new Android executable that a user wishes to install or an executable that is being screened for inclusion in an app store. At 202, characteristics of the executable are extracted from one or more classes in the first executable, including class definitions. These extracted characteristics are transformed into a set of class fingerprint strings corresponding to the classes in the first executable at 204. The class fingerprint strings are then transformed into a first hash string at 206, using a hashing method such as weighted b-bit minwise hashing.

The first hash is compared with hashes of executables known to be malicious at 208, such as by calculating the Hamming distance between the first hash and each hash in a hash database of hashes of known malicious executables. A determination is then made as to whether the first executable is likely malicious based on the difference between the first hash and the hashes in the malicious executable hash database at 210, and in a further example a user is notified of the result of the hash scan, or is notified only if the first executable is determined to be likely malicious. In other examples, other actions are taken, such a blocking installation or execution of the Android executable, forwarding the executable to a security provider for further review, or notifying an administrator of the likely malicious application determination.

In a more detailed example, the multiset of class fingerprint strings derived at 204 is obtained by evaluating a class definition list of an Android executable, such as information contained in the class_def_item structures in a Dalvik Executable (DEX) file. For each class, extracted information includes information such as access flags, superclass name, implemented interfaces, annotations, class data, and static values. This extracted information is used to form a class fingerprint string for each class, such as using a base string having a format of the form:

L_<flags>_S<u>I<w>A<x>D<y>V<z>

Where the string variables are represented as:
    <flags>—the class access flags as a decimal number, for example "16401"
        possible variation: it can contain only specific flags instead of all flags
    <u>—based on the superclass name of the class, it can be:
        "P" if superclass name is "Landroid/app/Application;"
        "B" if superclass name is "Landroid/content/BroadcastReceiver;"
        "A" if superclass name is "Landroid/app/Activity;"
        "S" if superclass name is "Landroid/app/Service;"
        "0" (zero) otherwise
        possible variation: it can contain different set of chosen superclasses than the set described above
    <w>—"1" if the class implements any interfaces, "0" otherwise
    <x>—"1" if the class has inner class annotation ("Ldalvik/annotation/InnerClass;"), "0" otherwise
        possible variation: the part could be equal to "1" if there are any annotations on the class, not only the annotation "Ldalvik/annotation/InnerClass;", "0" otherwise
    <y>—"1" if the class has class data, "0" otherwise
    <z>—"1" if the class has static values, "0" otherwise
Such that the resulting fingerprint string takes a form such as:

L_0_SBI0A0D1V0

Because there can be multiple fingerprint strings that are the same within a collection of strings for a given executable, the collected set of fingerprint strings is considered a multiset, where the number of repetitions of any fingerprint is a retained characteristic of the multiset. The format of the fingerprint string can be changed and be similarly effective, such as by reordering the variables included or altering or omitting the separator character "_" or the variable identifying letters L, S, I, A, D, and V.

The similarity hash is generated from the multiset of class fingerprint strings extracted from the main DEX file of the Android executable in one example, while in other examples more or all DEX files in a given Android executable are used to generate the hash. In this example, each unique class fingerprint string and the number of occurrences of each unique string in the multiset are transformed into a set by representing fingerprints occurring more than once by repeated fingerprints concatenated with a sequential number for each appearance of the same fingerprint. This expanded set of fingerprints is used as an input to a weighted b-bit minwise hashing function to output a final similarity hash of the Android executable.

Parameters for generating the hash include the desired length of the hash, which in one example is generated using 128 seeds in the minhashing scheme, and a b parameter of 1 which results in a final hash of 16 bytes. Other examples found to work well include 64 seeds with a hash length defined by b=2, or 256 seeds with a length defined by b=1.

The resulting hash is compared with hashes of known malicious Android executables by calculating the Hamming distance between the resulting hash and each hash of a malicious Android executable in a database. Granularity is selected based on the b parameter of the hash, and the resulting Hamming distance is a metric having a value reflecting the relative distance between the two hashes, such that the closest Android executables to an executable being evaluated can be determined by searching for the executables having the lowest Hamming distance between their hashes.

The methods described herein have advantages over prior methods of executable evaluation in that the hash is relatively easy to compute, and is resistant to most common obfuscation methods used in Android malware. The hash is effective at relatively short lengths, such as 16 bytes, and calculation and comparison of the Hamming distance between a hash of an Android executable being evaluated and malicious executables represented by a database of corresponding hashes is fast and straightforward. This makes the proposed method particularly desirable where large data sets of malicious Android executable hashes are employed, or where computational resources are limited such as in smart phones, app stores hosting a large number of Android executables, or IoT smart devices having relatively limited computational capability or limited battery power.

Figure 3:
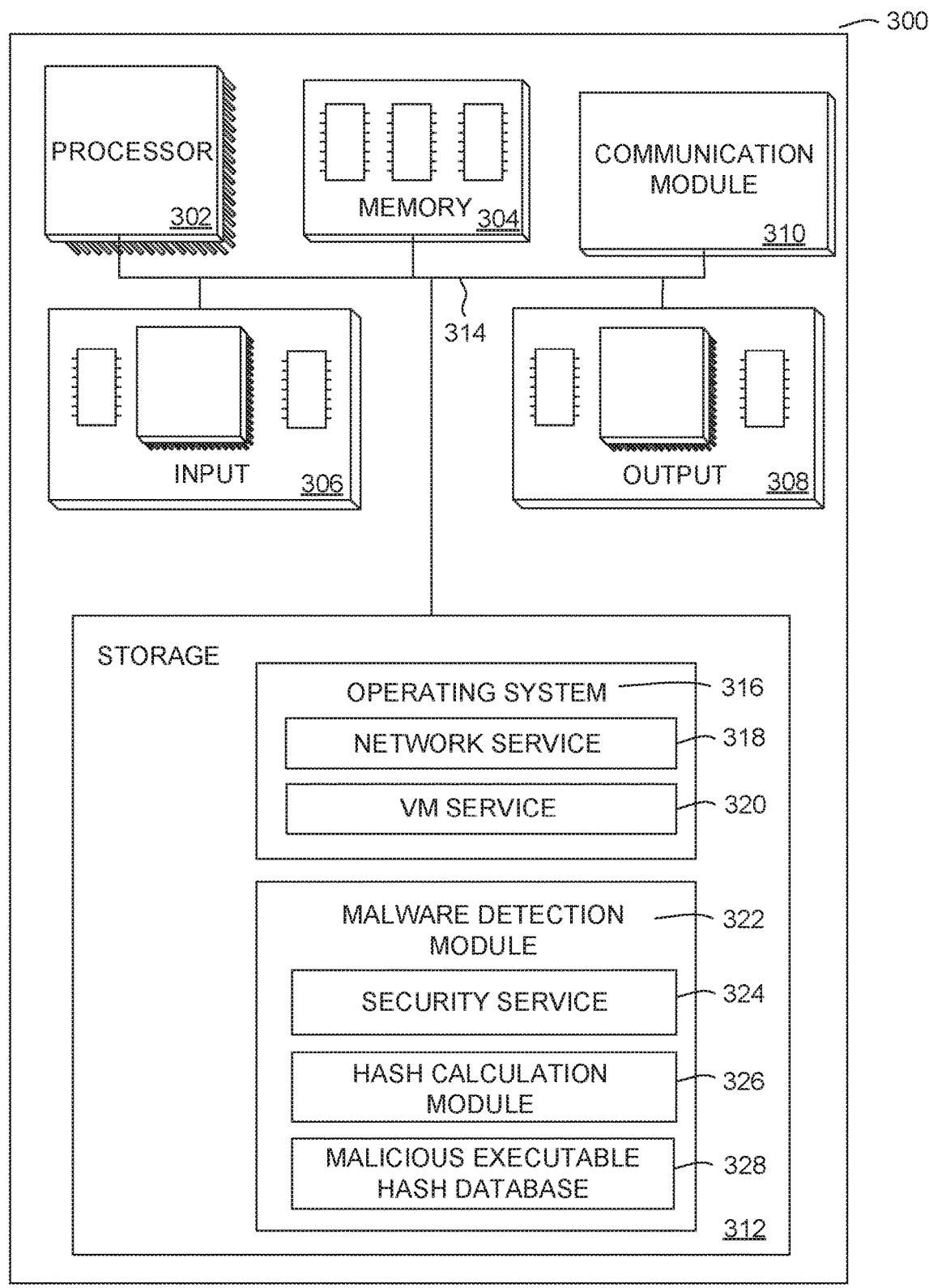
FIG. 3 is a computerized network security device, consistent with an example embodiment of the invention.

Although computerized devices such as smartphones, computers, and servers are shown in various examples presented herein, in other embodiments they will have fewer, more, and/or other components or features, such as those described in FIG. 3. FIG. 3 is a computerized network security device, consistent with an example embodiment of the invention. FIG. 3 illustrates only one particular example of network security device 300, and other computing devices may be used in other embodiments. Although network security device 300 is shown as a standalone computing device, device 300 may be any component or system that includes one or more processors or another suitable computing environment for executing software instructions in other examples, and need not include all of the elements shown here.

As shown in the specific example of FIG. 3, network security device 300 includes one or more processors 302, memory 304, one or more input devices 306, one or more output devices 308, one or more communication modules 310, and one or more storage devices 312. Device 300 in one example further includes an operating system 316 executable by network security device 300. The operating system includes in various examples services such as a network service 318 and a virtual machine service 320 such as a virtual server or various modules described herein. One or more applications, such as network protection module 322 are also stored on storage device 312, and are executable by network security device 300.

Each of components 302, 304, 306, 308, 310, and 312 may be interconnected (physically, communicatively, and/or operatively) for inter-component communications, such as via one or more communications channels 314. In some examples, communication channels 314 include a system bus, network connection, inter-processor communication network, or any other channel for communicating data. Applications such as malware detection module 322 and operating system 316 may also communicate information with one another as well as with other components in device 300.

Processors 302, in one example, are configured to implement functionality and/or process instructions for execution within computing device 300. For example, processors 302 may be capable of processing instructions stored in storage device 312 or memory 304. Examples of processors 302 include any one or more of a microprocessor, a controller, a digital signal processor (DSP), an application specific integrated circuit (ASIC), a field-programmable gate array (FPGA), or similar discrete or integrated logic circuitry.

One or more storage devices 312 may be configured to store information within network security device 300 during operation. Storage device 312, in some examples, is known as a computer-readable storage medium. In some examples, storage device 312 comprises temporary memory, meaning that a primary purpose of storage device 312 is not long-term storage. Storage device 312 in some examples is a volatile memory, meaning that storage device 312 does not maintain stored contents when network security device 300 is turned off. In other examples, data is loaded from storage device 312 into memory 304 during operation. Examples of volatile memories include random access memories (RAM), dynamic random access memories (DRAM), static random access memories (SRAM), and other forms of volatile memories known in the art. In some examples, storage device 312 is used to store program instructions for execution by processors 302. Storage device 312 and memory 304, in various examples, are used by software or applications running on network security device 300 such as malware detection module 322 to temporarily store information during program execution.

Storage device 312, in some examples, includes one or more computer-readable storage media that may be configured to store larger amounts of information than volatile memory. Storage device 312 may further be configured for long-term storage of information. In some examples, storage devices 312 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Network security device 300, in some examples, also includes one or more communication modules 310. Computing device 300 in one example uses communication module 310 to communicate with external devices via one or more networks, such as one or more wireless networks. Communication module 310 may be a network interface card, such as an Ethernet card, an optical transceiver, a radio frequency transceiver, or any other type of device that can send and/or receive information. Other examples of such network interfaces include Bluetooth, 4G, LTE, or 5G, WiFi radios, and Near-Field Communications (NFC), and Universal Serial Bus (USB). In some examples, network security device 300 uses communication module 310 to communicate with an external device such as via public network 122 of FIG. 1.

Network security device 300 also includes in one example one or more input devices 306. Input device 306, in some examples, is configured to receive input from a user through tactile, audio, or video input. Examples of input device 306 include a touchscreen display, a mouse, a keyboard, a voice-responsive system, a video camera, a microphone, or any other type of device for detecting input from a user.

One or more output devices 308 may also be included in computing device 300. Output device 308, in some examples, is configured to provide output to a user using tactile, audio, or video stimuli. Output device 308, in one example, includes a display, a sound card, a video graphics adapter card, or any other type of device for converting a signal into an appropriate form understandable to humans or machines. Additional examples of output device 308 include a speaker, a light-emitting diode (LED) display, a liquid crystal display (LCD), or any other type of device that can generate output to a user.

Network security device 300 may include operating system 316. Operating system 316, in some examples, controls the operation of components of network security device 300, and provides an interface from various applications such as malware detection module 322 to components of network security device 300. For example, operating system 316, in one example, facilitates the communication of various applications such as malware detection module 322 with processors 302, communication unit 310, storage device 312, input device 306, and output device 308. Applications such as malware detection module 322 may include program instructions and/or data that are executable by computing device 300. As one example, malware detection module 322 provides protection from malware and other threats using security service 324, which employs hash calculation module 326 to generate a hash of an Android executable that it then compares with the hashes of known malicious Android executables stored in malicious executable hash database 328. These and other program instructions or modules may include instructions that cause network security device 300 to perform one or more of the other operations and actions described in the examples presented herein.

Although specific embodiments have been illustrated and described herein, any arrangement that achieve the same purpose, structure, or function may be substituted for the specific embodiments shown. This application is intended to cover any adaptations or variations of the example embodiments of the invention described herein. These and other embodiments are within the scope of the following claims and their equivalents.

The invention claimed is:

1. A method of generating a similarity hash for an executable, comprising:
    extracting a plurality of characteristics for one or more classes in the executable, wherein the class characteristics are derived from class definitions corresponding to classes in the executable;
    transforming the plurality of characteristics into a set of one or more class fingerprint strings wherein each of the one or more class fingerprint strings corresponds to one of the one or more classes; and
    transforming the set of class fingerprint strings into a hash string using minwise hashing, such that a difference between hash strings for different executables is representative of the degree of difference between the executables.

2. The method of generating a similarity hash for an executable of claim 1, wherein the class characteristics are derived from class definition data comprising one or more of access flags, superclass name, implemented interfaces, annotations, class data, and static values.

3. The method of generating a similarity hash for an executable of claim 2, wherein the one or more fingerprint strings comprises one or more string characters representing each of the one or more class definition data types.

4. The method of generating a similarity hash for an executable of claim 1, wherein the executable comprises a Dalvik (DEX) executable.

5. The method of generating a similarity hash for an executable of claim 1, wherein transforming the set of class fingerprint strings into a hash string using minwise hashing comprises using weighted b-bit minwise hashing.

6. The method of generating a similarity hash for an executable of claim 1, wherein the executable is a Java executable.

7. The method of generating a similarity hash for an executable of claim 1, further comprising comparing the hash string with a second hash string from a second executable to determine the similarity between the executable and the second executable.

8. The method of generating a similarity hash for an executable of claim 7, wherein comparing the hash string with the hash string from a second executable comprises calculating a Hamming distance between the hash string and the second hash string.

9. The method of generating a similarity hash for an executable of claim 7, further comprising determining whether the executable and the second executable are likely related based on the determined similarity between the executable and the second executable.

10. A computerized security device, comprising:
    a processor and a memory;
    a database of hashes derived from and representing one or more known malicious executables; and
    an executable malware detection module comprising instructions operable when executed on the processor to extract a plurality of characteristics for one or more classes in a target executable, wherein the class characteristics are derived from class definitions corresponding to classes in the executable, transform the plurality of characteristics into a set of one or more class fingerprint strings wherein each of the one or more class fingerprint strings corresponds to one of the one or more classes, and transform the set of class fingerprint strings into a hash string using minwise hashing such that a difference between hash strings for the target executable and the hashes in the database represent a degree of difference between the target executable and the executables represented by the database hashes.

11. The computerized security device of claim 10, wherein the class characteristics are derived from class definition data comprising one or more of access flags, superclass name, implemented interfaces, annotations, class data, and static values.

12. The computerized security device of claim 11, wherein the one or more fingerprint strings comprises one or more string characters representing each of the one or more class definition data types.

13. The computerized security device of claim 10, wherein the executable comprises at least one of a Dalvik (DEX) executable.

14. The computerized security device of claim 10, wherein transforming the set of class fingerprint strings into a hash string using minwise hashing comprises using weighted b-bit minwise hashing.

15. The computerized security device of claim 10, wherein the executable is a Java executable.

16. The computerized security device of claim 10, the executable malware detection module further operable to compare the hash string with a second hash string from a second executable to determine the similarity between the target executable and the executables represented by the hash strings in the database representing known malicious executables.

17. The computerized security device of claim 16, wherein comparing the hash string with the hash string from a second executable comprises calculating a Hamming distance between the hash string and the second hash string.

18. The computerized security device of claim 16, the executable malware detection module further operable to determine whether the executable and the second executable are likely related based on the determined similarity between the target executable and the executables represented by the hashes in the database representing known malicious executables.

* * * * *